United States Patent
Matsumura et al.

(10) Patent No.: US 11,595,103 B2
(45) Date of Patent: Feb. 28, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/267,386

(22) PCT Filed: Aug. 10, 2018

(86) PCT No.: PCT/JP2018/030152
§ 371 (c)(1),
(2) Date: Feb. 9, 2021

(87) PCT Pub. No.: WO2020/031389
PCT Pub. Date: Feb. 13, 2020

(65) Prior Publication Data
US 2021/0297138 A1    Sep. 23, 2021

(51) Int. Cl.
*H04B 7/06* (2006.01)
*H04W 56/00* (2009.01)
*H04W 72/04* (2009.01)
*H04W 74/08* (2009.01)
*H04W 76/19* (2018.01)
(Continued)

(52) U.S. Cl.
CPC ........ *H04B 7/0695* (2013.01); *H04W 56/001* (2013.01); *H04W 72/046* (2013.01);
(Continued)

(58) Field of Classification Search
CPC ... H04B 7/0695; H04B 7/088; H04W 56/001; H04W 72/046; H04W 72/0493;
(Continued)

(56) References Cited

U.S. PATENT DOCUMENTS 9,900,891 B1    2/2018  Islam et al.
2018/0337757 A1*  11/2018  Noh ...................... H04L 5/0092
(Continued)

FOREIGN PATENT DOCUMENTS

WO    2018-118409 A1    6/2018

OTHER PUBLICATIONS

International Search Report issued in PCT/JP2018/030152 dated Oct. 30, 2018 (2 pages).
(Continued)

*Primary Examiner* — Harry H Kim
(74) *Attorney, Agent, or Firm* — Osha Bergman Watanabe & Burton LLP

(57) ABSTRACT

In order to appropriately control a TCI state for a CORESET in a beam recovery procedure for future radio communication systems, one aspect of a user terminal of the present disclosure includes a transmitting unit that transmits a beam failure recovery request (BFRQ), and a control unit that makes an assumption on a transmission configuration indicator state (TCI state) corresponding to a beam for which the beam failure recovery request (BFRQ) has been transmitted, as a CORESET TCI state related to a control resource set (CORESET) for beam failure recovery (BFR).

3 Claims, 8 Drawing Sheets

(51) Int. Cl.
*H04L 5/00* (2006.01)
*H04B 7/08* (2006.01)
*H04W 72/044* (2023.01)

(52) U.S. Cl.
CPC ... *H04W 72/0493* (2013.01); *H04W 74/0833* (2013.01); *H04W 76/19* (2018.02)

(58) Field of Classification Search
CPC .. H04W 74/0833; H04W 76/19; H04L 5/001; H04L 5/0048; H04L 5/0051
See application file for complete search history.

(56) References Cited

U.S. PATENT DOCUMENTS

| | | | |
|---|---|---|---|
| 2019/0260484 A1* | 8/2019 | Nam | H04B 17/309 |
| 2019/0319833 A1* | 10/2019 | Nagaraja | H04W 72/085 |
| 2020/0045709 A1* | 2/2020 | Seo | H04L 5/0051 |
| 2020/0305168 A1* | 9/2020 | Liou | H04W 72/0493 |
| 2021/0314218 A1* | 10/2021 | Kang | H04W 72/042 |

OTHER PUBLICATIONS

Written Opinion of the International Searching Authority issued in PCT/JP2018/030152 dated Oct. 30, 2018 (3 pages).

Vivo; "Remaining issues on mechanism to recover from beam failure"; 3GPP TSG RAN WG1 Meeting #92bis, R1-1803818; Sanya, China; Apr. 16-20, 2018 (6 pages).

Nokia, Nokia Shanghai Bell; "Remaining Details on Beam Recovery"; 3GPP TSG-RAN WG1 Meeting #93, R1-1807185; Busan, Korea; May 21-25, 2018 (7 pages).

3GPP TS 38.300 V15.2.0; "3rd Generation Partnership Project; Technical Specification Group Radio Access Network; NR; NR and NG-RAN Overall Description; Stage 2 (Release 15)"; Jun. 2018 (87 pages).

Extended European Search Report issued in European Application No. 18929488.7 dated Feb. 24, 2022 (10 pages).

Qualcomm Incorporated, "Beam management for NR", 3GPP TSG-RAN WG1 Meeting 93, R1-1807341, Busan, Korea, May 21-25, 2018 (11 pages).

MediaTek, Inc., "Summary 1 on Remaing issues on Beam Failure Recovery", 3GPP TSG RAN WG1 Meeting #93, R1-1807661, Busan, Korea, May 21-25, 2018 (26 pages).

Notice of Reasons for Refusal issued in Japanese Application No. 2020-535479 dated Jun. 21, 2022 (6 pages).

MediaTek Inc., "Summary 2 on Remaing issues on Beam Failure Recovery", 3GPP TSG RAN WG1 Meeting #93, R1-1807796, Busan, Korea, May 21-25, 2018 (29 pages).

* cited by examiner

USER TERMINAL AND RADIO COMMUNICATION METHOD

TECHNICAL FIELD

The present invention relates to a user terminal and a radio communication method in a next-generation mobile communication system.

BACKGROUND ART

At initial access in future radio communication systems (e.g., New Radio (NR)), at least one of detection of a synchronization signal block (SSB), acquisition of broadcast information (e.g., master information block (MIB)) communicated via a broadcast channel (physical broadcast channel (PBCH)), or establishment of a connection by random access is performed.

The synchronization signal block (SSB) may be a signal block that includes a synchronization signal and a broadcast channel. The signal block may be referred to as an SS/PBCH block. The synchronization signal may be, for example, at least one of a primary synchronization signal (PSS) or a secondary synchronization signal (SSS) (Non Patent Literature 1).

CITATION LIST

Non Patent Literature

Non Patent Literature 1: 3GPP TS 38.300 V15.2.0 "Technical Specification Group Radio Access Network; NR; NR and NG-RAN Overall description; Stage 2 (Release 15)", June 2018.

SUMMARY OF INVENTION

Technical Problem

In future radio communication systems (e.g., Rel. 15, New Radio (NR)), it is considered to perform, in a case where the quality of a specific beam deteriorates, a procedure for switching to another beam so as to reduce occurrence of radio link failure (RLF).

In a beam recovery procedure for future radio communication systems, a structure for switching CORESET #0 beam has not become clear.

The present invention has been made in view of the above points, and it is therefore an object of the present invention to provide a user terminal and a radio communication method capable of appropriately controlling a TCI state for a CORESET in the beam recovery procedure for future radio communication systems.

Solution to Problem

A user terminal according to an aspect of the present invention includes a transmitting unit that transmits a beam failure recovery request (BFRQ), and a control unit that makes an assumption on a transmission configuration indicator state (TCI state) corresponding to a beam for which the beam failure recovery request (BFRQ) has been transmitted, as a CORESET TCI state related to a control resource set (CORESET) for beam failure recovery (BFR).

Advantageous Effects of Invention

According to the present invention, the TCI state for a CORESET can be appropriately controlled in a beam recovery procedure for future radio communication systems.

DESCRIPTION OF EMBODIMENTS (CORESET)

At initial access in future radio communication systems (e.g., New Radio (NR)), at least one of detection of a synchronization signal block (SSB), acquisition of broadcast information (e.g., master information block (MIB)) communicated via a broadcast channel (physical broadcast channel (PBCH)), or establishment of a connection by random access is performed.

The synchronization signal block (SSB) may be a signal block that includes a synchronization signal and a broadcast channel. The signal block may be referred to as an SS/PBCH block. The synchronization signal may be, for example, at least one of a primary synchronization signal (PSS) or a secondary synchronization signal (SSS).

A user terminal detects a synchronization signal block (SSB), and determines a control resource set (CORESET) for system information (e.g., system information block 1 (SIB1) or remaining minimum system information (RMSI)) on the basis of information transmitted by a PBCH (e.g., MIB).

A CORESET is an allocation candidate domain for a downlink control channel (e.g., physical downlink control channel (PDCCH)). A CORESET for SIB1 is used to schedule downlink shared channels (e.g., physical downlink shared channel (PDSCH)) for transmitting the SIB1, in which a PDCCH (or downlink control information (DCI)) is placed. A CORESET for SIB1 is also referred to as CORESET #0,controlResourceSetZero, common CORESET, common CORESET #0,cell specific CORESET, or the like.

CORESET #0 may be associated with one or more search spaces. The search space may include at least one of a common search space (CSS) or a UE specific search space (USS). The common search space (CSS) is used to monitor DCI common to one or more user terminals. The UE specific search space (USS) is used to monitor DCI specific to a user terminal.

A search space or a set of search spaces associated with CORESET #0 includes at least one of a search space #0 (searchSpaceZero), a search space for SIB1 (type 0 PDCCH common search space, searchSpaceSIB), a search space for other system information (OSI) (type OA PDCCH common search space, searchSpace-OSI), a search space for paging (type 2 PDCCH common search space, paging-SearchSpace), or a search space for random access (type 1 PDCCH common search space, ra-SearchSpace).

The user terminal may configure CORESET #0 on the basis of an index in an MIB (also referred to as pdcch-ConfigSIB1 or RMSI-PDCCH-Config).

Figure 1:
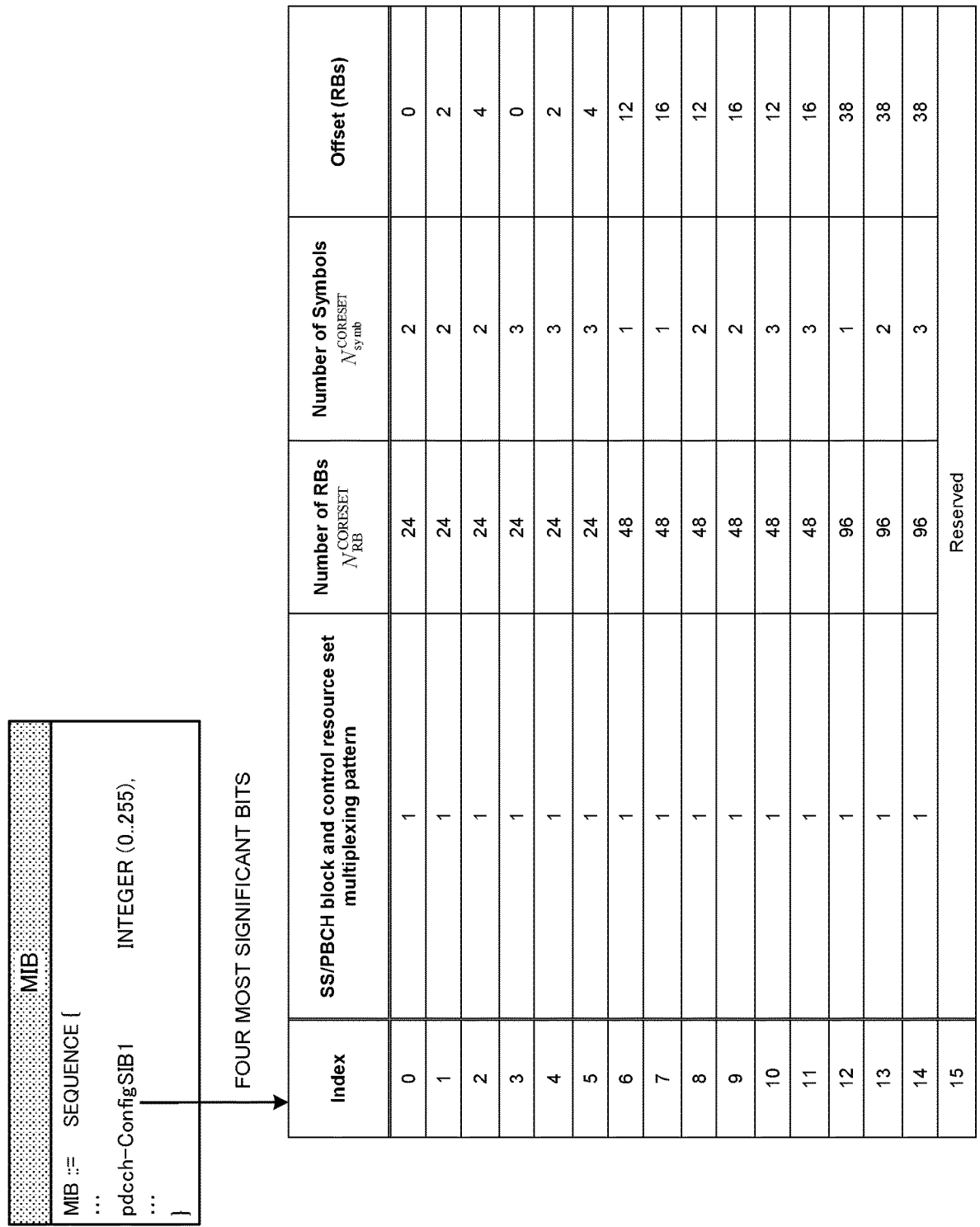
FIG. 1 is a diagram illustrating an example of configuration of CORESET #0 based on an MIB.

FIG. 1 is a diagram illustrating an example of configuration of CORESET #0 based on an MIB. As illustrated in FIG. 1, the MIB may include pdcch-ConfigSIB1 of a predetermined number of bits (e.g., eight bits). The user terminal configures at least one of a frequency domain resource or a time domain resource allocated to CORESET #0 on the basis of at least one bit value of pdcch-ConfigSIB1. The frequency domain resource is also referred to as a bandwidth, a resource block (resource block (RB) or physical resource block (PRB)), or the number of RBs. The time domain resource is also referred to as a period, a symbol, or the number of symbols.

In the example illustrated in FIG. 1, the user terminal may determine, for CORESET #0, the number of resource blocks (RBs) (NCORESETRB), the number of symbols (NCORESETsymb), and a resource block (RB) offset that are associated with an index indicated by four bits of pdcch-ConfigSIB1 (e.g., the four most significant bits (MSBs)). The user terminal may determine search space #0 on the basis of the remaining four bits of pdcch-ConfigSIB1 (e.g., the four least significant bits (LSBs)).

The values associated with each index in FIG. 1 are merely examples and are not limited to those illustrated. For example, each value may be changed on the basis of at least one of a minimum channel bandwidth or subcarrier spacing (SCS).

A bandwidth of CORESET #0 may be rephrased as a bandwidth of a bandwidth part (BWP) for initial access (also referred to as an initial BWP). The BWP is a partial band in a carrier (a component carrier (CC), a cell, a serving cell, or a system bandwidth). The BWP may include a BWP for uplink (uplink BWP) and a BWP for downlink (downlink BWP).

One or more BWPs (at least one of one or more uplink BWPs or one or more downlink BWPs) may be configured for the user terminal, and at least one of the configured BWPs may be activated. The activated BWP is also referred to as an active BWP.

The user terminal may determine CORESET #0 on the basis of a parameter for CORESET #0 in the SIB1 (also referred to as controlResourceSetZero). The controlResourceSetZero (e.g., four bits) may be interpreted as the corresponding bits (e.g., the four most significant bits) in pdcch-ConfigSIB1 in the MIB.

In FIG. 1, the user terminal may determine, for CORESET #0, the number of resource blocks (RBs) (NCORESETRB), the number of symbols (NCORESETsymb), and a resource block (RB) offset that are associated with an index indicated by controlResourceSetZero.

The controlResourceSetZero in the SIB1 may be configured for each serving cell or for each downlink BWP. The user terminal may acquire a parameter for CORESET #0 regardless of the currently active BWP, even in a case where controlResourceSetZero is included in PDCCH configuration information (pdcchConfigCommon) in the initial BWP (BWP #0).

(QCL/TCI)

The user terminal may assume that there is a quasi-co-location (QCL) relationship between a detected synchronization signal block (SSB) and an antenna port for a demodulation reference signal (DMRS) of the PDCCH in CORESET #0 (or a search space associated with CORESET #0) that is configured on the basis of the MIB or the SIB'.

QCL is an indicator of statistical properties of at least one of channels or signals (channels/signals). In a case where one signal or channel has a QCL relationship with another signal or channel, this may mean that it is possible to assume that the plurality of different signals or channels are the same in at least one of Doppler shift, Doppler spread, average delay, delay spread, or spatial parameter (e.g., spatial reception parameter) (QCL for at least one of these).

The spatial reception parameter may correspond to a reception beam of the user terminal (e.g., reception analog beam), or a beam may be specified on the basis of the spatial QCL. The QCL and at least one element of the QCL in the present disclosure may be replaced with spatial QCL (sQCL).

A plurality of QCL types may be defined. For example, four QCL types (QCL type A to QCL type D) that differ in parameter or parameter set in which signals or channels are assumed to be the same may be provided.

QCL type A is a QCL in which signals or channels are assumed to be the same in Doppler shift, Doppler spread, average delay, and delay spread.

QCL type B is a QCL in which signals or channels are assumed to be the same in Doppler shift and Doppler spread.

QCL type C is a QCL in which signals or channels are assumed to be the same in average delay and Doppler shift.

QCL type D is a QCL in which signals or channels are assumed to be the same in spatial reception parameter.

In future radio communication systems, it is considered to control channel transmitting/receiving processing on the basis of a transmission configuration indicator (TCI) state.

The TCI state may indicate QCL information. Alternatively, the TCI state may include QCL information. At least one of the TCI state or the QCL information may be, for example, information regarding a QCL of a channel of interest or a reference signal for that channel and another signal (e.g., another downlink reference signal). The information regarding the QCL may include, for example, at least one of information regarding a downlink reference signal to be in a QCL relationship or information indicating the QCL type described above.

A signal (RS, SSB, or CSI-RS) that is in a QCL relationship with a DMRS of a PDCCH may be referred to as a QCL source for the PDCCH. The TCI state may indicate the QCL source.

It is considered to change the QCL source (TCI state) for CORESET #0 by a random access procedure.

In the user terminal, one or more synchronization signal blocks (SSBs) or channel state information reference signals (CSI-RSs) are configured by dedicated RACH configuration (RACH-ConfigDedicated) for configuring at least one of a PRACH preamble or a resource for contention free random access (CFRA). The user terminal may measure the synchronization signal block (SSB) or the CSI-RS, select a PRACH resource corresponding to the synchronization signal block (SSB) or the CSI-RS selected on the basis of a result of the measurement, and transmit a PRACH. The user terminal may determine the synchronization signal block (SSB) or the CSI-RS selected during the CFRA as a new QCL source (TCI state) for CORESET #0 after the CFRA.

The user terminal may determine a synchronization signal block (SSB) selected during contention based random access (CBRA) as a new QCL source (TCI state) for CORESET #0 after the CBRA.

(Beam Failure Recovery)

In future radio communication systems (e.g., NR, Rel. 15 or later), it is considered to perform communication using beam forming (BF). In order to improve communication quality using beam forming (BF), it is considered to control at least one of signal transmission or signal reception in consideration of a quasi-co-location (QCL) relationship (QCL relationship) between a plurality of signals.

In a case where beam forming (BF) is used, influence of disturbance by obstacles tends to increase, which can lead to poor radio link quality and frequent occurrence of radio link failures (RLFs). When a radio link failure (RLF) occurs, cell re-connection is required, and hence frequent occurrence of radio link failures (RLFs) causes deterioration of system throughput.

In future radio communication systems (e.g., NR), it is considered to perform, in a case where the quality of a specific beam deteriorates, a procedure for switching to another beam so as to reduce occurrence of radio link failure (RLF). The procedure for switching to another beam may be referred to as "beam recovery (BR)", "beam failure recovery (BFR)", "Layer 1/Layer 2 (L1/L2) beam recovery", or the like. A beam failure recovery (BFR) procedure may simply be referred to as BFR.

A beam failure in the present disclosure may be referred to as a link failure.

Figure 2:
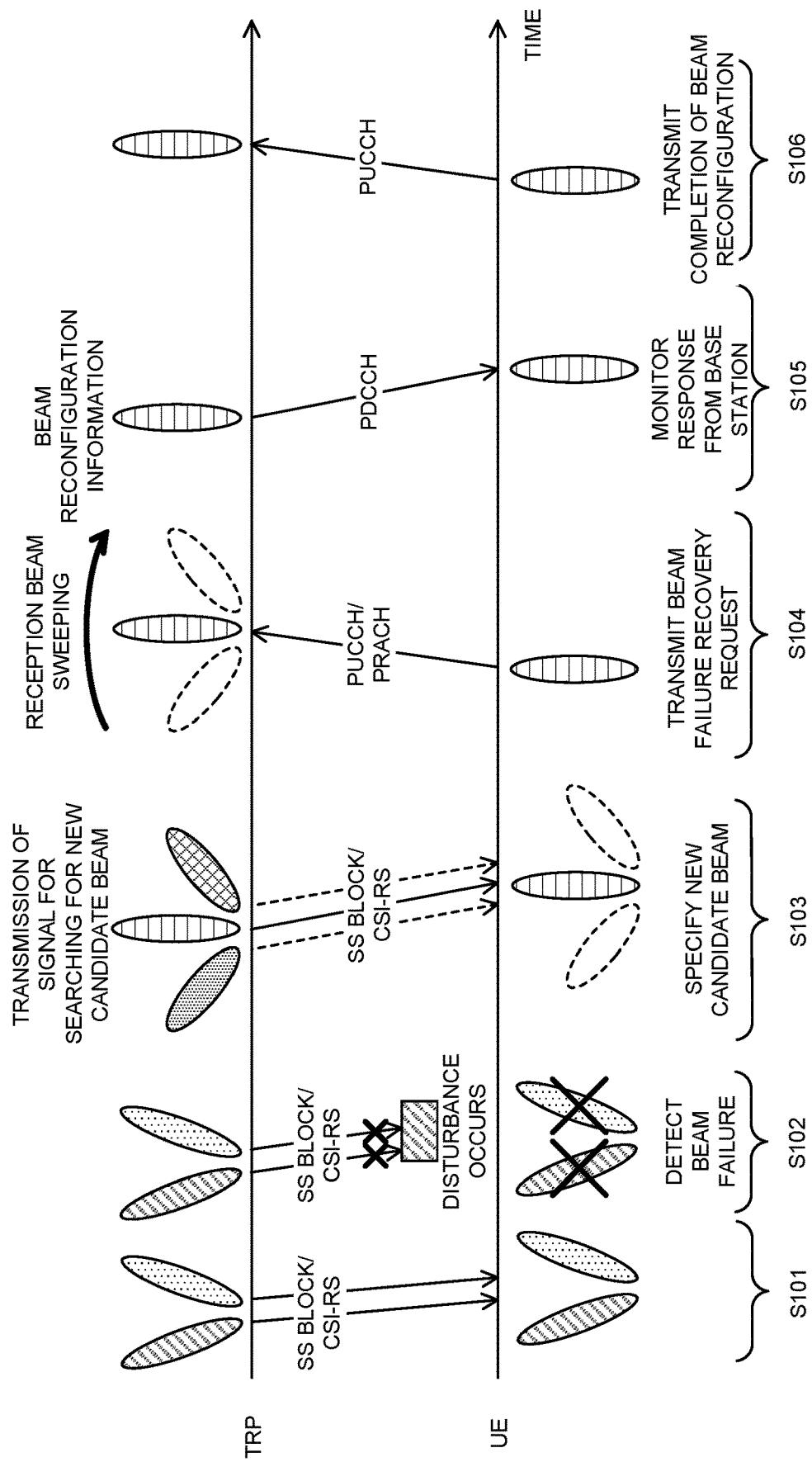
FIG. 2 is a diagram illustrating an example of a beam recovery procedure for future radio communication systems.

FIG. 2 is a diagram illustrating an example of a beam recovery procedure for future radio communication systems. The number of beams and the like illustrated in FIG. 2 are examples, and not restrictive.

In an initial state (step S101), the user terminal uses two beams to perform a measurement based on a reference signal (RS) resource transmitted from a transmission/reception point (TRP). The reference signal may be at least one of a synchronization signal block (SSB) or a channel state information RS (CSI-RS). The synchronization signal block (SSB) may be referred to as an SS/PBCH (Physical Broadcast Channel) block.

The reference signal may be at least one of a primary synchronization signal (primary SS (PSS)), a secondary synchronization signal (secondary SS (SSS)), a mobility reference signal (mobility RS (MRS)), a synchronization signal block (SSB), a signal included in an SSB, a CSI-RS, a demodulation reference signal (demodulation RS (DMRS)), or a beam-specific signal, or may be a signal structured by expanding or changing these signals. The reference signal measured in step S101 may be referred to as a beam failure detection reference signal (beam failure detection RS (BFD-RS)).

In step S102, the user terminal fails to detect the beam failure detection reference signal (BFD-RS) due to radio wave from the transmission/reception point (TRP) being disturbed. Such a disturbance occurs under the influence of, for example, obstacles, fading, or interference between the user terminal and the transmission/reception point (TRP).

The user terminal detects a beam failure when a predetermined condition is satisfied. The user terminal may detect an occurrence of a beam failure in a case where, for example, a block error rate (BLER) is less than a threshold value for all configured beam failure detection reference signals (BFD-RSs) (BFD-RS resource configuration). When an occurrence of a beam failure is detected, a lower layer (physical layer) of the user terminal may give a notification (command) of a beam failure instance to a higher layer (MAC layer).

A criterion for determining detection of an occurrence of a beam failure is not limited to the block error rate (BLER), and may be physical layer reference signal received power (L1-RS received power (L1-RSRP)). Instead of a reference signal (RS) measurement or in addition to a reference signal (RS) measurement, a beam failure may be detected on the basis of a downlink control channel (physical downlink control channel (PDCCH)) or the like. A beam failure detection reference signal (BFD-RS) may be expected to have a quasi-co-location (QCL) relationship with a DMRS of a PDCCH monitored by the user terminal.

Information regarding a beam failure detection reference signal (BFD-RS) such as an index, resource, the number, the number of ports, or precoding of the reference signal, and information regarding beam failure detection (BFD) such as the threshold value described above may be configured in (reported to) the user terminal by using higher layer signaling. The information regarding the beam failure detection reference signal (BFD-RS) may be referred to as information regarding a resource for BFD.

The higher layer signaling may be, for example, any one of radio resource control (RRC) signaling, medium access control (MAC) signaling, or broadcast information, or may be any combination thereof.

The MAC layer of the user terminal may start a predetermined timer when a beam failure instance notification is received from the physical layer of the user terminal. The timer may be referred to as a beam failure detection timer. The MAC layer of the user terminal may trigger beam failure recovery (BFR) (e.g., start any of random access procedures described later) in a case where the beam failure instance notification has been received a certain number of times or more (e.g., beamFailureInstanceMaxCount configured by the RRC) before the timer expires.

The transmission/reception point (TRP) may determine that a user terminal has detected a beam failure if no notification has been received from the user terminal or if a predetermined signal (beam failure recovery request in step S104) has been received from the user terminal.

In step S103, the user terminal starts a search for a new candidate beam to be newly used for communication for beam recovery. The user terminal may measure a predetermined reference signal (RS) to select a new candidate beam corresponding to the reference signal (RS). The reference signal (RS) measured in step S103 may be referred to as a new candidate beam identification RS (NCBI-RS). The new candidate beam identification RS (NCBI-RS) may be the same as or different from the beam failure detection reference signal (BFD-RS). The new candidate beam may be simply referred to as a candidate beam.

The user terminal may determine a beam corresponding to a reference signal (RS) satisfying a predetermined condition as a new candidate beam. For example, the user terminal may determine a new candidate beam on the basis of a reference signal (RS), in which L1-RS received power (L1-RSRP) exceeds a threshold value, among new candidate beam identification RSs (NCBI-RSs) that have been configured. The criterion for determining a new candidate beam is not limited to the L1-RSRP. The L1-RSRP for a synchronization signal block (SSB) may be referred to as SS-RSRP. The L1-RSRP for a CSI-RS may be referred to as CSI-RSRP.

Information regarding a new candidate beam identification RS (NCBI-RS) such as a resource, the number, the number of ports, or precoding of the reference signal, and information regarding new candidate beam identification (NCBI) such as the threshold value described above may be configured in (reported to) the user terminal via higher layer signaling. The information regarding the new candidate beam identification RS (NCBI-RS) may be acquired by the user terminal on the basis of the information regarding the beam failure detection reference signal (BFD-RS). The information regarding the new candidate beam identification RS (NCBI-RS) may be referred to as information regarding a resource for new candidate beam identification (NCBI).

The beam failure detection reference signal (BFD-RS) and the new candidate beam identification RS (NCBI-RS) may be replaced with radio link monitoring RSs (RLM-RSs).

In step S104, the user terminal that has specified a new candidate beam transmits a beam failure recovery request (BFRQ) to the transmission/reception point (TRP). The beam failure recovery request (BFRQ) may be referred to as a beam recovery request signal, a beam failure recovery request signal, or the like.

The beam failure recovery request (BFRQ) may be transmitted by using, for example, at least one of an uplink control channel (physical uplink control channel (PUCCH)), a random access channel (physical random access channel (PRACH)), an uplink shared channel (physical uplink shared channel (PUSCH)), a sounding reference signal (SRS), or a configured grant (PUSCH).

The beam failure recovery request (BFRQ) may include information regarding the new candidate beam specified in step S103. The resource for the beam failure recovery request (BFRQ) may be associated with the new candidate beam. Beam information may be reported by using a beam index (BI), a port index of a predetermined reference signal, a resource index (e.g., CSI-RS resource indicator), a synchronization signal block (SSB) resource indicator (SSBRI), or the like.

In future radio communication systems (e.g., Rel. 15 NR), contention-based BFR (CB-BFR) and contention-free BFR (CF-BFR) are being considered. The CB-BFR is beam failure recovery (BFR) based on a contention-based random access procedure. The CF-BFR is beam failure recovery (BFR) based on a contention-free random access procedure. In CB-BFR and CF-BFR, the user terminal may use a PRACH resource to transmit a preamble as a beam failure recovery request (BFRQ). The preamble may be referred to as a random access (RA) preamble, a random access channel (PRACH), or a RACH preamble.

In contention-based BFR (CB-BFR), the user terminal may transmit a preamble randomly selected from one or more preambles. In contention-free BFR (CF-BFR), the user terminal may transmit a preamble that has been allocated specifically to the UE by a base station. In CB-BFR, the base station may allocate the same preamble to a plurality of user terminals. In CF-BFR, the base station may allocate a dedicated preamble to each user terminal.

Contention-based BFR (CB-BFR) may be referred to as contention-based PRACH-based BFR (CB PRACH-based BFR (CBRA-BFR)). Contention-free BFR (CF-BFR) may be referred to as contention-free PRACH-based BFR (CF PRACH-based BFR (CFRA-BFR)). CBRA-BFR may be referred to as "CBRA for BFR". CFRA-BFR may be referred to as "CFRA for BFR".

In contention-based BFR (CB-BFR), when a base station has received a preamble as a beam failure recovery request (BFRQ), the base station is not required to be capable of identifying from which user terminal the preamble has been transmitted. The base station can identify an identifier (e.g., cell-radio network temporary identifier (C-RNTI)) of the user terminal that has transmitted the preamble by performing contention resolution after a beam failure recovery request (BFRQ) and before completion of beam reconfiguration.

A signal (e.g., preamble) transmitted by the user terminal during a random access procedure may be assumed to be a beam failure recovery request (BFRQ).

In either contention-based BFR (CB-BFR) or contention-free BFR (CF-BFR), information regarding a PRACH resource (RA preamble) may be reported via higher layer signaling (e.g., RRC signaling). For example, the information may include information indicating a correspondence relationship between a detected DL-RS (beam) and a PRACH resource, and each DL-RS may be associated with a different PRACH resource.

Detection of a beam failure may be performed at the MAC layer. In a case of contention-based BFR (CB-BFR), a user terminal may determine that contention resolution has been successful if a PDCCH corresponding to the C-RNTI for that user terminal has been received.

Random access (RA) parameters for contention-based BFR (CB-BFR) and those for contention-free BFR (CF-BFR) may be constituted by the same parameter set, or different values may be configured for each of them.

For example, a parameter (ResponseWindowSize-BFR) indicating the time length for gNB response monitoring in a control resource set (CORESET) for a beam failure recovery response after a beam failure recovery request (BFRQ) may be applied to only one of contention-based BFR (CB-BFR) or contention-free BFR (CF-BFR).

In future radio communication systems (e.g., Rel. 16), it is considered to use an uplink channel such as a PUCCH, a PUSCH, or a SRS to transmit a beam failure recovery request (BFRQ). For example, a user terminal may use a scheduling request (SR) resource for a PUCCH to transmit a beam failure recovery request (BFRQ).

In step S105, the transmission/reception point (e.g., a base station) that has detected the beam failure recovery request (BFRQ) transmits a response signal for the beam failure recovery request (BFRQ) from the user terminal. The response signal may be referred to as a gNB response. The response signal may include reconfiguration information regarding one or more beams (e.g., DL-RS resource configuration information).

The response signal may be transmitted in a search space shared by user terminals of a PDCCH, for example. The response signal may be reported by using a PDCCH scrambled in a cyclic redundancy check (CRC) with the identifier of the user terminal such as the C-RNTI, or downlink control information (DCI). The user terminal may determine, on the basis of beam reconfiguration information, at least one of a Tx beam or a reception beam to be used.

The user terminal may monitor the response signal in a search space for a response signal for a beam failure recovery request (BFRQ response (BFRQR)). The user terminal may monitor the response signal on the basis of at least one of a CORESET for beam failure recovery (BFR) or a search space set for beam failure recovery (BFR).

In a case of contention-based BFR (CB-BFR), a user terminal may determine that contention resolution has been successful if a PDCCH corresponding to the C-RNTI for that user terminal has been received.

In the processing of step S105, a period may be configured for the user terminal to monitor a response from the transmission/reception point (TRP) for the beam failure recovery request (BFRQ). The period may be referred to as, for example, a gNB response window, a gNB window, or a beam failure recovery request response window.

The user terminal may retransmit the beam failure recovery request (BFRQ) if no gNB response has been detected during the window period.

In step S106, the user terminal may transmit a message to notify the transmission/reception point (TRP) of completion of beam reconfiguration. The message may be transmitted, for example, by using a PUCCH or a PUSCH.

A beam recovery success (BR success) may indicate a case where the processing has reached step S106, for example. A beam recovery failure (BR failure) may correspond to, for example, the beam failure recovery request (BFRQ) having been transmitted a predetermined number of times. The beam recovery failure may correspond to, for example, a beam-failure-recovery-timer having been expired.

The step numbers in FIG. 2 are only for explanatory purpose. A plurality of steps may be performed together, or the order of the steps may be changed. Whether or not to perform the beam failure recovery (BFR) procedure may be configured in the user terminal via higher layer signaling.

In a case where the CORESET #0 beam is switched after completion of the beam recovery procedure illustrated in FIG. 2, it is necessary to transmit the PRACH to the user terminal again through a network in order to switch the CORESET #0 beam.

Thus, the present inventors have specifically considered a structure for switching the CORESET #0 beam in a beam recovery procedure for future radio communication systems.

A radio communication method according to the present embodiment will be described below in detail with reference to the attached drawings.

(Radio Communication Method)

In step S104 of the beam recovery procedure illustrated in FIG. 2, in a case where beam failure recovery (BFR) based on a random access procedure is performed, the user terminal may assume that the TCI state of CORESET #0 becomes a TCI state corresponding to a PRACH resource transmitted as a beam failure recovery request (BFRQ).

In step S105 of the beam recovery procedure illustrated in FIG. 2, the user terminal monitors a response from the transmission/reception point (e.g., a base station) to the beam failure recovery request (BFRQ) by monitoring a PDCCH in a search space for a BFRQ response (BFRQR). This search space may be referred to as a search space associated with a CORESET for beam failure recovery (BFR), a CORESET BFR, a BFR search space, or the like.

In the beam recovery procedure, in a case where the CORESET associated with the BFR search space is CORESET #0, the user terminal may assume that the TCI state of CORESET #0 becomes a TCI state corresponding to a PRACH resource transmitted as a beam failure recovery request (BFRQ).

In the beam recovery procedure, in a case where a TCI state has not been configured for the CORESET associated with the BFR search space, the user terminal may assume that the TCI state of CORESET #0 becomes a TCI state corresponding to a PRACH resource transmitted as a beam failure recovery request (BFRQ).

In a case where contention-based BFR (CB-BFR) is performed, the user terminal may assume that the TCI state of CORESET #0 becomes a TCI state corresponding to a PRACH resource transmitted as a beam failure recovery request (BFRQ).

In a case where contention-free BFR (CF-BFR) is performed, the user terminal may assume that the TCI state of CORESET #0 becomes a TCI state corresponding to a PRACH resource transmitted as a beam failure recovery request (BFRQ).

Alternatively, the TCI state of CORESET #0 assumed by the user terminal may differ depending on whether contention-based BFR (CB-BFR) is performed or contention-free BFR (CF-BFR) is performed.

In a case where contention-based BFR (CB-BFR) is performed, the user terminal may assume that the TCI state of CORESET #0 becomes a TCI state corresponding to a PRACH resource transmitted as a beam failure recovery request (BFRQ), and in a case where contention-free BFR (CF-BFR) is performed, the user terminal may use a TCI state that has been originally configured as the TCI state of CORESET #0.

In a case where contention-free BFR (CF-BFR) is performed, the user terminal may assume that the TCI state of CORESET #0 becomes a TCI state corresponding to a PRACH resource transmitted as a beam failure recovery request (BFRQ), and in a case where contention-based BFR (CB-BFR) is performed, the user terminal may use a TCI state that has been originally configured as the TCI state of CORESET #0.

Alternatively, the TCI state of CORESET #0 assumed by the user terminal may differ depending on whether beam failure recovery based on a random access procedure is performed or another type of beam failure recovery is performed. The other type of beam failure recovery includes, for example, the case where the user terminal transmits a beam failure recovery request (BFRQ) using an uplink channel in step S104 of the beam recovery procedure illustrated in FIG. 2.

In step S104 of the beam recovery procedure illustrated in FIG. 2, in a case where the other type of beam failure recovery (BFR) is performed, the user terminal may assume that the TCI state of CORESET #0 becomes a TCI state corresponding to a beam for which the beam failure recovery request (BFRQ) has been transmitted.

In a case where beam failure recovery based on a random access procedure is performed, the user terminal may assume that the TCI state of CORESET #0 becomes a TCI state corresponding to a PRACH resource transmitted as a beam failure recovery request (BFRQ), and in a case where another type of beam failure recovery is performed, the user terminal may use a TCI state that has been originally configured as the TCI state of CORESET #0.

In a case where beam failure recovery based on a random access procedure is performed, the user terminal may use a TCI state that has been originally configured as the TCI state of CORESET #0, and in a case where another type of beam failure recovery is performed, the user terminal may assume that the TCI state of CORESET #0 becomes a TCI state corresponding to a beam for which the beam failure recovery request (BFRQ) has been transmitted.

With these structures, the CORESET #0 beam can also be switched when the beam recovery procedure is completed. It is not necessary to transmit the PRACH to the user terminal again through the network after completion of the beam recovery procedure in order to switch the CORESET #0 beam.

(Radio Communication System)

A structure of a radio communication system according to the present embodiment will be described below. In this radio communication system, the radio communication method according to the embodiment described above is applied.

Figure 3:
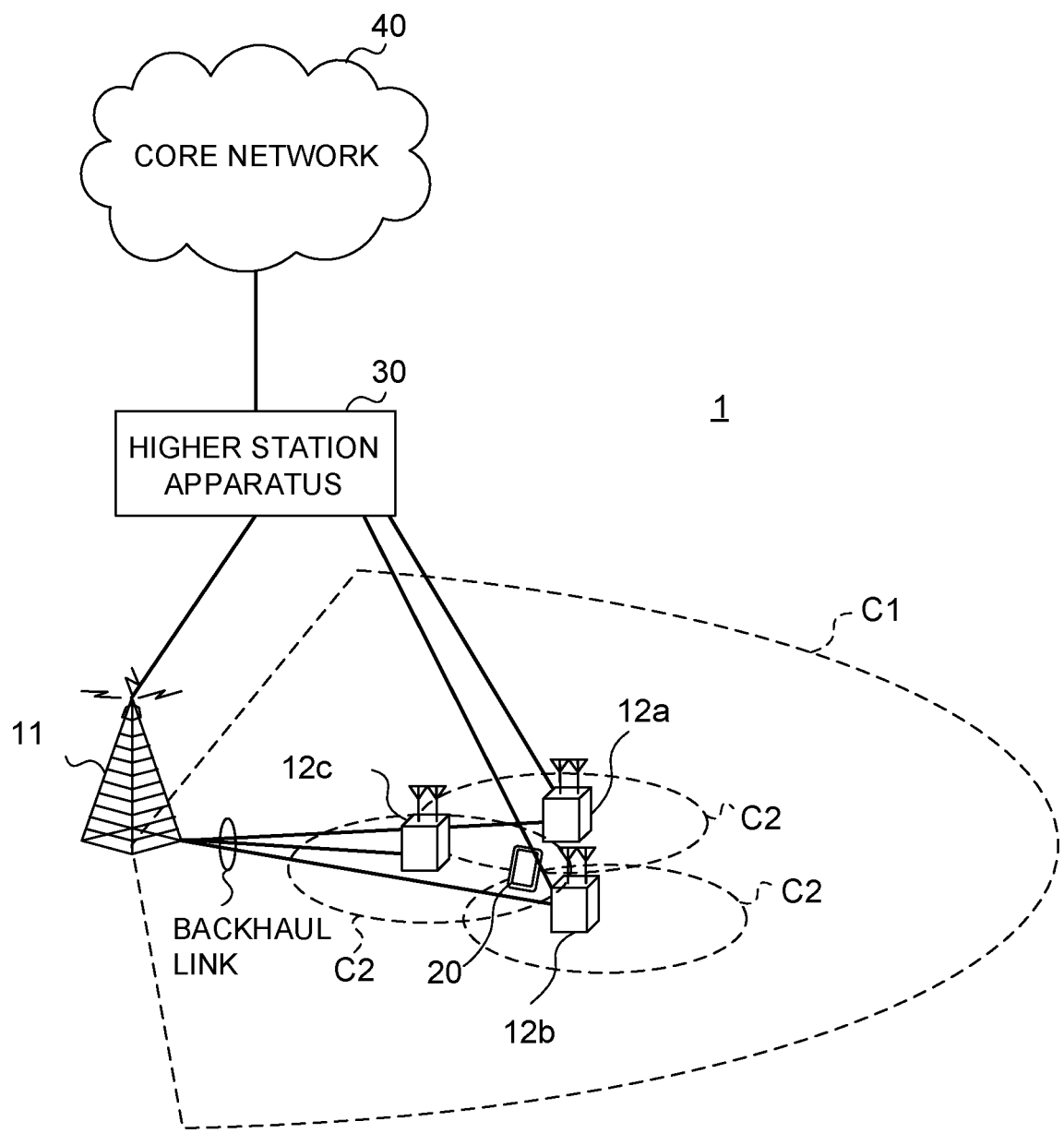
FIG. 3 is a diagram illustrating an example of a schematic structure of a radio communication system according to the present embodiment.

FIG. 3 is a diagram illustrating an example of a schematic structure of the radio communication system according to the present embodiment. In a radio communication system 1, it is possible to apply carrier aggregation (CA) or dual connectivity (DC) to group a plurality of fundamental frequency blocks (component carriers (CCs)) into one, in which one fundamental frequency block corresponds to a system bandwidth (e.g., 20 MHz) of an LTE system. The radio communication system 1 may be referred to as SUPER 3G, LTE-Advanced (LTE-A), IMT-Advanced, 4G, 5G, future radio access (FRA), New Radio (NR), or the like.

The radio communication system 1 may support dual connectivity (Multi-RAT DC (MR-DC)) between a plurality of radio access technologies (RATs). MR-DC may include dual connectivity (E-UTRA-NR DC (EN-DC)) between LTE and NR in which a base station (eNB) of LTE (E-UTRA) serves as a master node, and a base station (gNB) of NR serves as a secondary node, and dual connectivity (NR-E-UTRA DC (NE-DC)) between NR and LTE in which a base station (gNB) of NR serves as a master node, and a base station (eNB) of LTE serves as a secondary node.

The radio communication system 1 includes a base station 11 that forms a macro cell C1, and base stations 12a to 12c that are placed in the macro cell C1 and form small cells C2, which are narrower than the macro cell C1. A user terminal 20 is placed in the macro cell C1 and in each small cell C2. A different numerology may be applied to each cell. A numerology refers to a signal design in a certain RAT or a set of communication parameters that characterize the RAT design.

The user terminal 20 can connect with both the base station 11 and the base stations 12. It is assumed that the user terminal 20 simultaneously uses the macro cell C1 and the small cells C2, which use different frequencies, by carrier aggregation (CA) or dual connectivity (DC). The user terminal 20 can apply carrier aggregation (CA) or dual connectivity (DC) by using a plurality of cells (CCs) (e.g., two or more CCs). The user terminal can use a licensed band CC and an unlicensed band CC as a plurality of cells. A TDD carrier to which a shortened TTI is applied may be included in any of the plurality of cells.

Between the user terminal 20 and the base station 11, communication can be performed by using a carrier with a narrow bandwidth in a relatively low frequency band (e.g., 2 GHz) (this carrier is also referred to as an existing carrier, a legacy carrier, or the like). Between the user terminal 20 and a base station 12, a carrier with a wide bandwidth in a relatively high frequency band (e.g., 3.5 GHz, 5 GHz, or 30 to 70 GHz) may be used, or the same carrier as that for use between the user terminal 20 and the base station 11 may be used. The structure of the frequency band for use in each base station is not limited to that described above.

A wired connection (for example, means in compliance with a common public radio interface (CPRI) such as an optical fiber or an X2 interface) or a radio connection may be established between the base station 11 and a base station 12 (or between two base stations 12).

Each of the base station 11 and the base stations 12 is connected with a higher station apparatus 30, and is connected to a core network 40 via the higher station apparatus 30. The higher station apparatus 30 may be, for example, an access gateway apparatus, a radio network controller (RNC), or a mobility management entity (MME), but is by no means limited to these. Each base station 12 may be connected to the higher station apparatus 30 via the base station 11.

The base station 11 has a relatively wide coverage, and may be referred to as a macro base station, an aggregate node, an eNodeB (eNB), a transmission/reception point, or the like. The base stations 12 have local coverages, and may be referred to as small base stations, micro base stations, pico base stations, femto base stations, Home eNodeBs (HeNBs), remote radio heads (RRHs), transmission/reception points, or the like. The base stations 11 and 12 are hereinafter collectively referred to as base stations 10.

The user terminals 20 are terminals that support various communication schemes such as LTE and LTE-A, and may include not only mobile communication terminals but also stationary communication terminals.

In the radio communication system 1, as radio access schemes, orthogonal frequency division multiple access (OFDMA) can be applied to a downlink (DL), and single carrier frequency division multiple access (SC-FDMA) can be applied to an uplink (UL). OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing a system bandwidth into bands including one or consecutive resource blocks for each terminal, and allowing a plurality of terminals to use mutually different bands. The uplink and downlink radio access schemes are not limited to the combination described above, and OFDMA may be used in the uplink.

In the radio communication system 1, a downlink data channel (also referred to as a physical downlink shared channel (PDSCH), a downlink shared channel, or the like), which is shared by the user terminals 20, a broadcast channel (physical broadcast channel (PBCH)), an L1/L2 control channel, or the like is used as a DL channel. The PDSCH is used to communicate user data, higher layer control information, a system information block (SIB), and the like. The PBCH is used to communicate a master information block (MIB).

The L1/L2 control channel includes a downlink control channel (physical downlink control channel (PDCCH) or enhanced physical downlink control channel (EPDCCH)), a physical control format indicator channel (PCFICH), a physical hybrid-ARQ indicator channel (PHICH), and the like. The PDCCH is used to communicate downlink control information (DCI) including PDSCH and PUSCH scheduling information and the like. The PCFICH is used to communicate the number of OFDM symbols to use for the PDCCH. The PHICH is used to communicate HARQ delivery acknowledgment information (ACK/NACK) in response to a PUSCH. The EPDCCH is frequency-division-multiplexed with the PDSCH (downlink shared data channel), and used to communicate DCI and the like in a similar manner to the PDCCH.

In the radio communication system 1, an uplink data channel (also referred to as a physical uplink shared channel (PUSCH), an uplink shared channel, or the like), which is shared by the user terminals 20, an uplink control channel (physical uplink control channel (PUCCH)), a random access channel (physical random access channel (PRACH)), or the like is used as a UL channel. The PUSCH is used to communicate user data and higher layer control information. Uplink control information (UCI) that includes at least one of delivery acknowledgment information (ACK/NACK) or channel quality indicator (CQI) is communicated by using the PUSCH or the PUCCH. The PRACH is used to communicate random access preambles for establishing connections with cells <Base Station>

Figure 4:
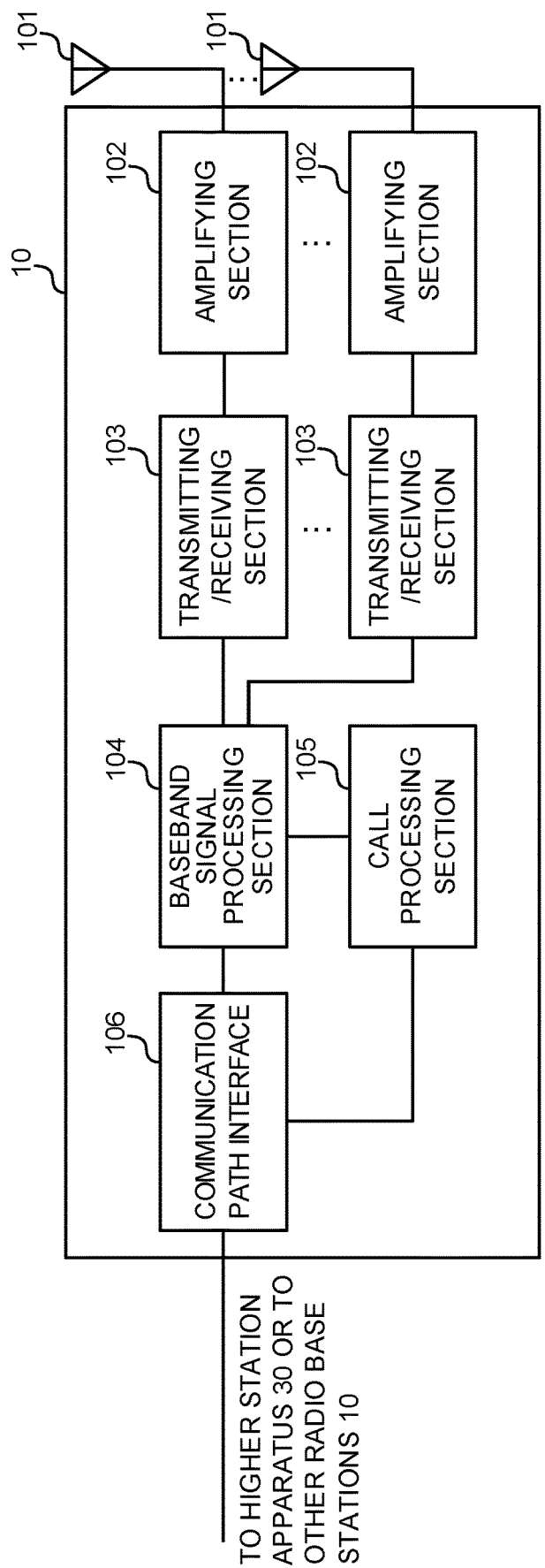
FIG. 4 is a diagram illustrating an example of a functional structure of a radio base station according to the present embodiment.

FIG. 4 is a diagram illustrating an example of an overall structure of a base station according to the present embodiment. A base station 10 includes a plurality of transmitting/receiving antennas 101, amplifying units 102, transmitting/receiving units 103, a baseband signal processing unit 104, a call processing unit 105, and a communication path interface 106. As for the transmitting/receiving antennas 101, the amplifying units 102, and the transmitting/receiving units 103, it is sufficient if one or more from each of them is included in the structure. The base station 10 is a downlink data transmitting apparatus, or may be an uplink data receiving apparatus.

Downlink data to be transmitted from the base station 10 to the user terminal 20 is input from the higher station apparatus 30 to the baseband signal processing unit 104 via the communication path interface 106.

In the baseband signal processing unit 104, downlink data is subjected to transmission processing, including processing of a packet data convergence protocol (PDCP) layer, division and coupling of user data, radio link control (RLC) layer transmission processing such as RLC retransmission control, medium access control (MAC) retransmission control (e.g., HARQ transmission processing), scheduling, transmission format selection, channel coding, inverse fast Fourier transform (IFFT) processing, and precoding processing, and the result is forwarded to the transmitting/receiving unit 103. A downlink control signal is also subjected to transmission processing such as channel coding and inverse fast Fourier transform, and forwarded to the transmitting/receiving unit 103.

The transmitting/receiving unit 103 converts a baseband signal, which has been pre-coded for each antenna and output from the baseband signal processing unit 104, into a signal in a radio frequency band, and then transmits the converted signal. The radio frequency signal that has been subjected to frequency conversion by the transmitting/receiving unit 103 is amplified by the amplifying unit 102, and transmitted from the transmitting/receiving antenna 101. The transmitting/receiving unit 103 can be constituted by a transmitter/receiver, a transmitting/receiving circuit, or a transmitting/receiving apparatus described on the basis of the common knowledge in the technical field of the present invention. The transmitting/receiving unit 103 may be structured as an integrated transmitting/receiving unit, or may be constituted by a transmitting unit and a receiving unit.

As for an uplink signal, a radio frequency signal received by the transmitting/receiving antenna 101 is amplified by the amplifying unit 102. The transmitting/receiving unit 103 receives the uplink signal amplified by the amplifying unit 102. The received signal is converted into a baseband signal through frequency conversion in the transmitting/receiving unit 103 and output to the baseband signal processing unit 104.

In the baseband signal processing unit 104, user data included in the input uplink signal is subjected to fast Fourier transform (FFT) processing, inverse discrete Fourier transform (IDFT) processing, error correction decoding, MAC retransmission control receiving processing, and RLC layer and PDCP layer receiving processing, and then forwarded to the higher station apparatus 30 via the communication path interface 106. The call processing unit 105 performs call processing, such as configuring and releasing of communication channels, manages the state of the base stations 10, and manages radio resources.

The communication path interface 106 transmits and receives signals to and from the higher station apparatus 30 via a predetermined interface. The communication path interface 106 may transmit and receive signals (backhaul signaling) to and from another base station 10 via an inter-base station interface (for example, means in compliance with a common public radio interface (CPRI) such as an optical fiber or an X2 interface).

The transmitting/receiving unit 103 may further include an analog beam forming unit that performs analog beam forming. The analog beam forming unit can be constituted by an analog beam forming circuit (e.g., a phase shifter or a phase shift circuit) or an analog beam forming apparatus (e.g., a phase shifter) described on the basis of the common knowledge in the technical field of the present invention. The transmitting/receiving antenna 101 can be constituted by an array antenna, for example. The transmitting/receiving unit 103 allows single BF and multi BF to be applied.

The transmitting/receiving unit 103 may use a Tx beam to transmit a signal, and may use a reception beam to receive a signal. The transmitting/receiving unit 103 may use a predetermined beam determined by a control unit 301 to transmit and receive a signal.

The transmitting/receiving unit 103 transmits downlink signals (e.g., downlink control signals (downlink control channels), downlink data signals (downlink data channels and downlink shared channels), downlink reference signals (DM-RS, CSI-RS, and the like), discovery signals, synchronization signals, broadcast signals, and the like). The transmitting/receiving unit 103 receives uplink signals (e.g., uplink control signals (uplink control channels), uplink data signals (uplink data channels and uplink shared channels), uplink reference signals, and the like).

The transmitting/receiving unit 103 may receive a beam failure recovery request (BFRQ) and transmit a BFRQ response (BFRQR) in the beam recovery procedure.

The transmitting unit and the receiving unit of the present invention are constituted by both of or one of the transmitting/receiving unit 103 and the communication path interface 106.

Figure 5:
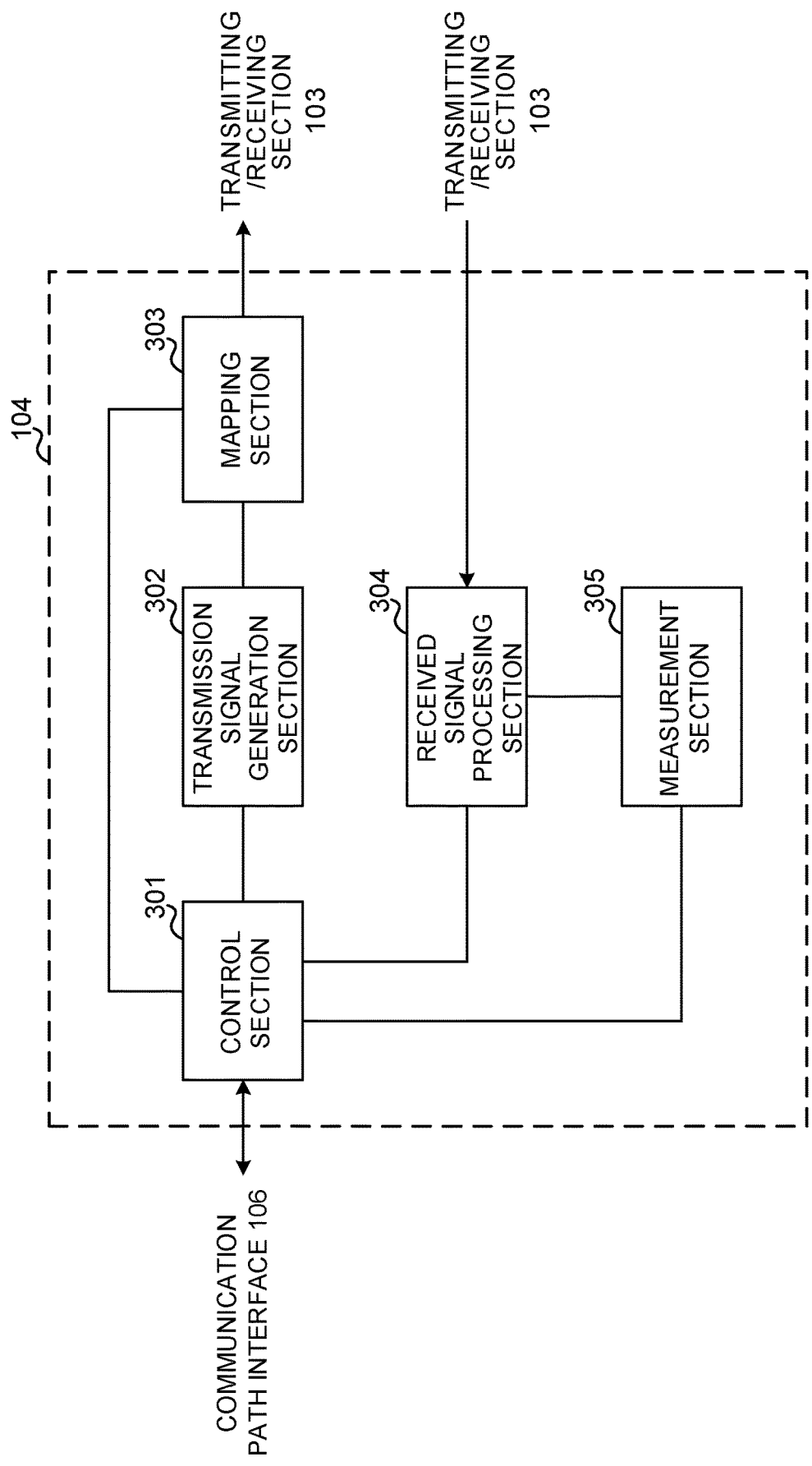
FIG. 5 is a diagram illustrating an example of a functional structure of a baseband signal processing unit of a radio base station.

FIG. 5 is a diagram illustrating an example of a functional structure of a base station according to the present embodiment. This drawing mainly illustrates functional blocks that pertain to characteristic parts of the present embodiment, and it is assumed that the base station 10 has other functional blocks necessary for radio communication as well. The baseband signal processing unit 104 includes at least the control unit 301, a transmission signal generation unit 302, a mapping unit 303, a received signal processing unit 304, and a measurement unit 305.

The control unit 301 controls the whole of the base station 10. The control unit 301 can be constituted by a controller, a control circuit, or a control apparatus described on the basis of the common knowledge in the technical field of the present invention.

The control unit 301 controls, for example, generation of signals by the transmission signal generation unit 302 and allocation of signals by the mapping unit 303. The control unit 301 controls signal receiving processing by the received signal processing unit 304 and signal measurement by the measurement unit 305.

The control unit 301 controls scheduling (e.g., resource allocation) of downlink signals and uplink signals. Specifically, the control unit 301 controls the transmission signal generation unit 302, the mapping unit 303, and the transmitting/receiving unit 103 so as to generate and transmit DCI (DL assignment or DL grant) including downlink data channel scheduling information and DCI (UL grant) including uplink data channel scheduling information.

The transmission signal generation unit 302 generates downlink signals (downlink control channels, downlink data channels, downlink reference signals such as DM-RS, and the like) on the basis of commands from the control unit 301, and outputs the signals to the mapping unit 303. The transmission signal generation unit 302 can be constituted by a signal generator, a signal generating circuit, or a signal generation apparatus described on the basis of the common knowledge in the technical field of the present invention.

The mapping unit 303 maps the downlink signals generated by the transmission signal generation unit 302 to predetermined radio resources on the basis of commands from the control unit 301, and outputs the result to the transmitting/receiving unit 103. The mapping unit 303 can be constituted by a mapper, a mapping circuit, or a mapping apparatus described on the basis of the common knowledge in the technical field of the present invention.

The received signal processing unit 304 performs receiving processing (e.g., demapping, demodulation, or decoding) on received signals input from the transmitting/receiving unit 103. For example, the received signals include uplink signals (uplink control channels, uplink data channels, uplink reference signals, and the like) transmitted from the user terminals 20. The received signal processing unit 304 can be constituted by a signal processor, a signal processing circuit, or a signal processing apparatus described on the basis of the common knowledge in the technical field of the present invention.

The received signal processing unit 304 outputs the decoded information acquired through the receiving processing to the control unit 301. For example, the receiving processing unit 304 outputs at least one of a preamble, control information, or UL data to the control unit 301. In addition, the received signal processing unit 304 outputs received signals and signals after the receiving processing to the measurement unit 305.

The measurement unit 305 conducts measurements with respect to the received signals. The measurement unit 305 can be constituted by a measurer, a measurement circuit, or a measurement apparatus described on the basis of the common knowledge in the technical field of the present invention.

The measurement unit 305 may measure, for example, the received power (e.g., reference signal received power (RSRP)), the received quality (e.g., reference signal received quality (RSRQ)), the channel state, and the like of the received signals. The measurement results may be output to the control unit 301.

<User Terminal>

Figure 6:
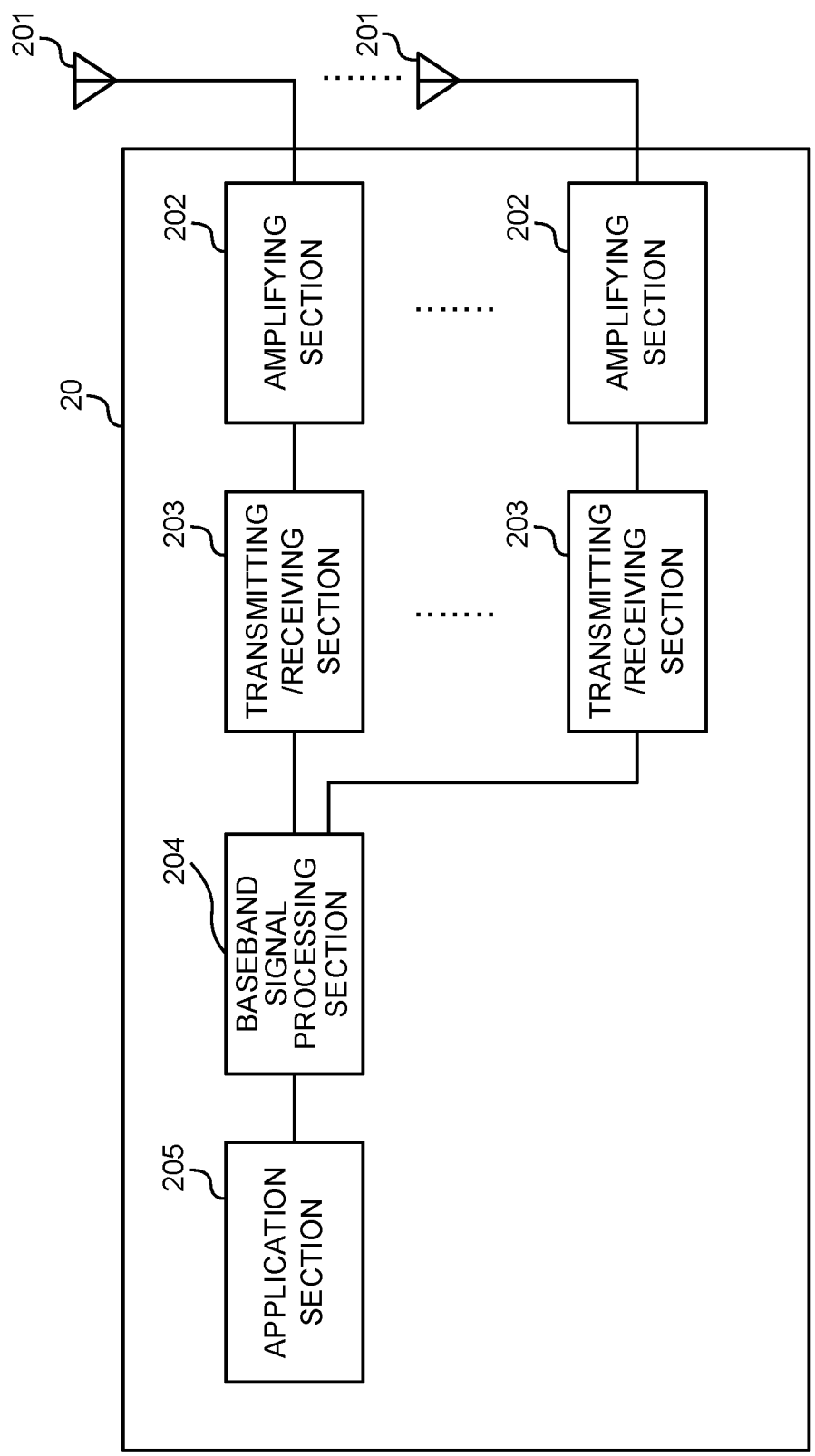
FIG. 6 is a diagram illustrating an example of a functional structure of a user terminal according to the present embodiment.

FIG. 6 is a diagram illustrating an example of an overall structure of a user terminal according to the present embodiment. A user terminal 20 includes a plurality of transmitting/receiving antennas 201, amplifying units 202, transmitting/receiving units 203, a baseband signal processing unit 204, and an application unit 205. As for the transmitting/receiving antennas 201, the amplifying units 202, and the transmitting/receiving units 203, it is sufficient if one or more from each of them is included in the structure. The user terminal 20 is a downlink data receiving apparatus, or may be an uplink data transmitting apparatus.

Radio frequency signals that have been received in the transmitting/receiving antenna 201 are amplified in the amplifying unit 202. The transmitting/receiving unit 203 receives the downlink signals amplified in the amplifying unit 202. The received signals are subjected to frequency conversion and converted into the baseband signal in the transmitting/receiving unit 203, and output to the baseband signal processing unit 204. The transmitting/receiving unit 203 can be constituted by a transmitter/receiver, a transmitting/receiving circuit, or a transmitting/receiving apparatus described on the basis of the common knowledge in the technical field of the present invention. The transmitting/receiving unit 203 may be structured as an integrated transmitting/receiving unit, or may be constituted by a transmitting unit and a receiving unit.

The baseband signal processing unit 204 performs FFT processing, error correction decoding, retransmission control receiving processing, and the like on baseband signals that have been input. Downlink data is forwarded to the application unit 205. The application unit 205 performs, for example, processing related to layers higher than a physical layer and a MAC layer. System information and higher layer control information in the downlink data are also forwarded to the application unit 205.

Uplink user data is input from the application unit 205 to the baseband signal processing unit 204. The baseband signal processing unit 204 performs retransmission control transmission processing (e.g., HARQ transmission processing), channel coding, precoding, discrete Fourier transform (DFT) processing, IFFT processing, and the like, and the result is forwarded to the transmitting/receiving unit 203. The transmitting/receiving unit 203 converts a baseband signal, which has been output from the baseband signal processing unit 204, into a signal in a radio frequency band, and then transmits the converted signal. The radio frequency signal that has been subjected to frequency conversion by the transmitting/receiving unit 203 is amplified by the amplifying unit 202, and transmitted from the transmitting/receiving antenna 201.

The transmitting/receiving unit 203 may further include an analog beam forming unit that performs analog beam forming. The analog beam forming unit can be constituted by an analog beam forming circuit (e.g., a phase shifter or a phase shift circuit) or an analog beam forming apparatus (e.g., a phase shifter) described on the basis of the common knowledge in the technical field of the present invention. The transmitting/receiving antenna 201 can be constituted by an array antenna, for example. The transmitting/receiving unit 203 allows single BF and multi BF to be applied.

The transmitting/receiving unit 203 may use a Tx beam to transmit a signal, and may use a reception beam to receive a signal. The transmitting/receiving unit 203 may use a predetermined beam determined by a control unit 401 to transmit and receive a signal.

The transmitting/receiving unit 203 transmits downlink signals (e.g., downlink control signals (downlink control channels), downlink data signals (downlink data channels and downlink shared channels), downlink reference signals (DM-RS, CSI-RS, and the like), discovery signals, synchronization signals, broadcast signals, and the like). The transmitting/receiving unit 203 transmits uplink signals (e.g., uplink control signals (uplink control channels), uplink data signals (uplink data channels and uplink shared channels), uplink reference signals, and the like).

The transmitting/receiving unit 203 may transmit a beam failure recovery request (BFRQ) and receive a BFRQ response (BFRQR) in the beam recovery procedure.

Figure 7:
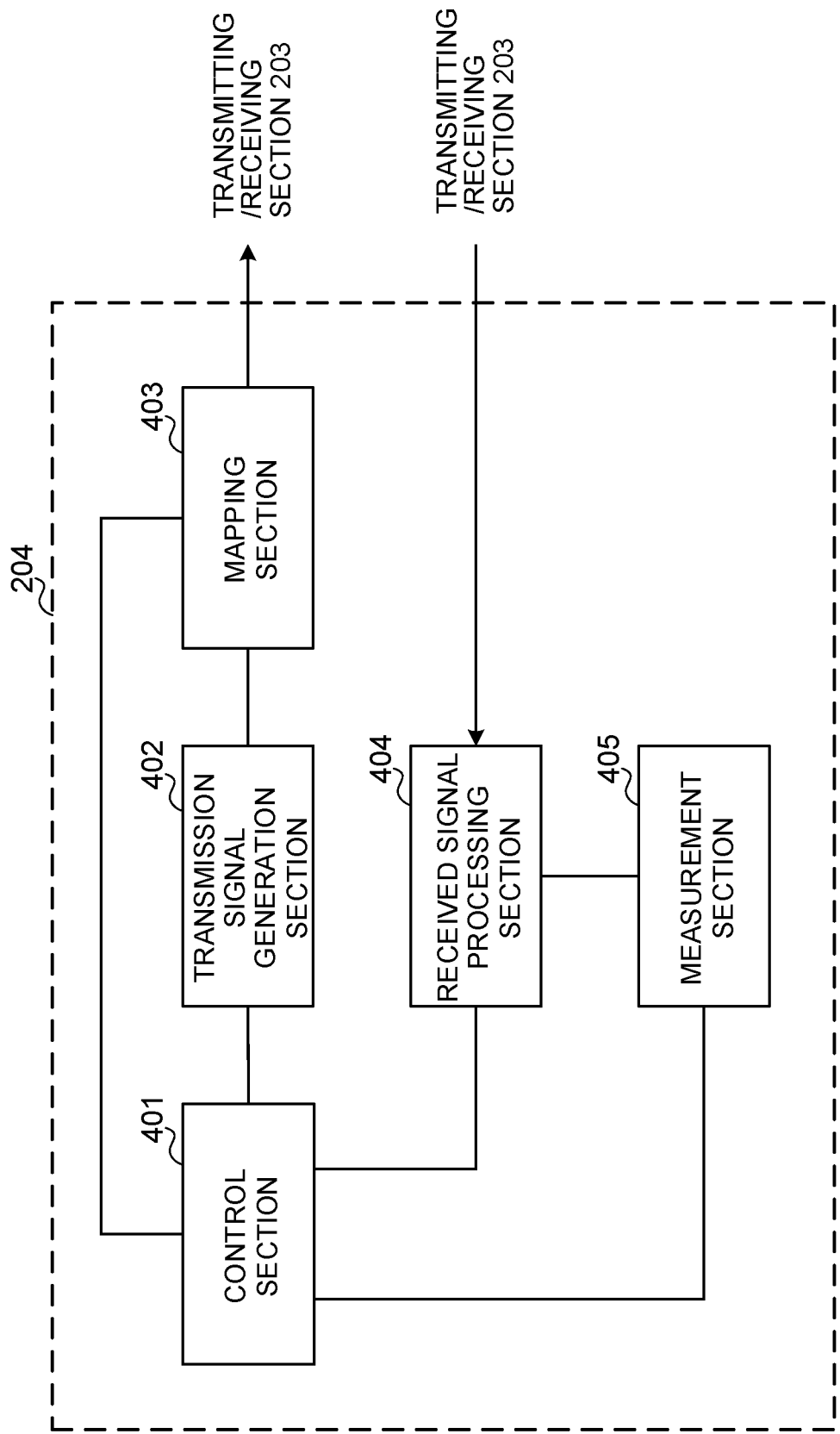
FIG. 7 is a diagram illustrating an example of a functional structure of a baseband signal processing unit of a user terminal.

FIG. 7 is a diagram illustrating an example of a functional structure of a user terminal according to the present embodiment. This drawing mainly illustrates functional blocks that pertain to characteristic parts of the present embodiment, and it is assumed that the user terminal 20 has other functional blocks necessary for radio communication as well. The baseband signal processing unit 204 included in the user terminal 20 includes at least the control unit 401, a transmission signal generation unit 402, a mapping unit 403, a received signal processing unit 404, and a measurement unit 405.

The control unit 401 controls the whole of the user terminal 20. The control unit 401 can be constituted by a controller, a control circuit, or a control apparatus described on the basis of the common knowledge in the technical field of the present invention.

The control unit 401 controls, for example, generation of signals by the transmission signal generation unit 402 and allocation of signals by the mapping unit 403. The control unit 401 controls signal receiving processing by the received signal processing unit 404 and signal measurement by the measurement unit 405.

The control unit 401 may assume a transmission configuration indicator state (TCI state) corresponding to a beam for which the beam failure recovery request (BFRQ) has been transmitted, as a CORESET TCI state related to a control resource set (CORESET) for beam failure recovery (BFR).

The control unit 401 may assume a TCI state corresponding to a physical random access channel (PRACH) resource used to transmit the beam failure recovery request (BFRQ) as the TCI state of the control resource set (CORESET).

In a case where the CORESET related to the control resource set (CORESET) for beam failure recovery (BFR) is CORESET #0, the control unit 401 may assume the TCI state corresponding to the physical random access channel (PRACH) resource used to transmit the beam failure recovery request (BFRQ) as the TCI state of CORESET #0.

In a case where contention-based BFR (CB-BFR) is performed, the control unit 401 may assume the TCI state corresponding to the physical random access channel (PRACH) resource used to transmit the beam failure recovery request (BFRQ) as the TCI state of CORESET #0.

The control unit 401 may control, depending on whether contention-based BFR (CB-BFR) is performed or contention-free BFR (CF-BFR) is performed, whether to assume, as the TCI state of CORESET #0, the TCI state corresponding to the physical random access channel (PRACH) resource used to transmit the beam failure recovery request (BFRQ).

The transmission signal generation unit 402 generates uplink signals (uplink control channels, uplink data channels, uplink reference signals, and the like) on the basis of commands from the control unit 401, and outputs these signals to the mapping unit 403. The transmission signal generation unit 402 can be constituted by a signal generator, a signal generating circuit, or a signal generation apparatus described on the basis of the common knowledge in the technical field of the present invention.

The transmission signal generation unit 402 generates uplink data channels on the basis of commands from the control unit 401. For example, in a case where a UL grant is included in a downlink control channel that is reported from the base station 10, the control unit 401 commands the transmission signal generation unit 402 to generate an uplink data channel.

The mapping unit 403 maps the uplink signals generated by the transmission signal generation unit 402 to radio resources on the basis of commands from the control unit 401, and outputs the result to the transmitting/receiving unit 203. The mapping unit 403 can be constituted by a mapper, a mapping circuit, or a mapping apparatus described on the basis of the common knowledge in the technical field of the present invention.

The received signal processing unit 404 performs receiving processing (e.g., demapping, demodulation, or decoding) on received signals input from the transmitting/receiving unit 203. For example, the received signals include downlink signals (downlink control channels, downlink data channels, downlink reference signals, and the like) transmitted from the base station 10. The received signal processing unit 404 can be constituted by a signal processor, a signal processing circuit, or a signal processing apparatus described on the basis of the common knowledge in the technical field of the present invention. The received signal processing unit 404 can constitute a receiving unit according to the present invention.

The received signal processing unit 404 blind-decodes downlink control channels that schedule transmission and reception of downlink data channels on the basis of commands from the control unit 401, and performs receiving processing of the downlink data channels on the basis of the DCI. The received signal processing unit 404 estimates a channel gain on the basis of DM-RS or CRS, and demodulates the downlink data channels on the basis of the estimated channel gain.

The received signal processing unit 404 output the decoded information that is acquired through the receiving processing to the control unit 401. The received signal processing unit 404 outputs, for example, broadcast information, system information, RRC signaling, and DCI, to the control unit 401. The received signal processing unit 404 may output the data decoding result to the control unit 401. The received signal processing unit 404 outputs received signals and signals after the receiving processing to the measurement unit 405.

The measurement unit 405 conducts measurements with respect to the received signals. The measurement unit 405 can be constituted by a measurer, a measurement circuit, or a measurement apparatus described on the basis of the common knowledge in the technical field of the present invention.

The measurement unit 405 may measure, for example, the received power (e.g., RSRP), the DL received quality (e.g., RSRQ), the channel state, and the like of the received signals. The measurement results may be output to the control unit 401.

(Hardware Structure)

The block diagrams that have been used to describe the above embodiments illustrate blocks in functional units. These functional blocks (components) may be implemented in any combination of at least one of hardware or software. The method for implementing each functional block is not particularly limited. That is, each functional block may be implemented by one apparatus that is physically or logically aggregated, or may be implemented by a plurality of apparatuses, which are two or more physically or logically separate apparatuses that are directly or indirectly (for example, by wire or wirelessly) connected to each other. The functional block may be implemented by a combination of software and the above-described one apparatus or the above-described plurality of apparatuses.

Here, "functional" includes, but is not limited to, determining, judging, calculating, computing, processing, deriving, investigating, looking up, search, inquiry, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning. For example, a functional block (component) having a transmission function may be referred to as a transmitting unit or a transmitter. In any case, as described above, the implementation method is not particularly limited.

Figure 8:
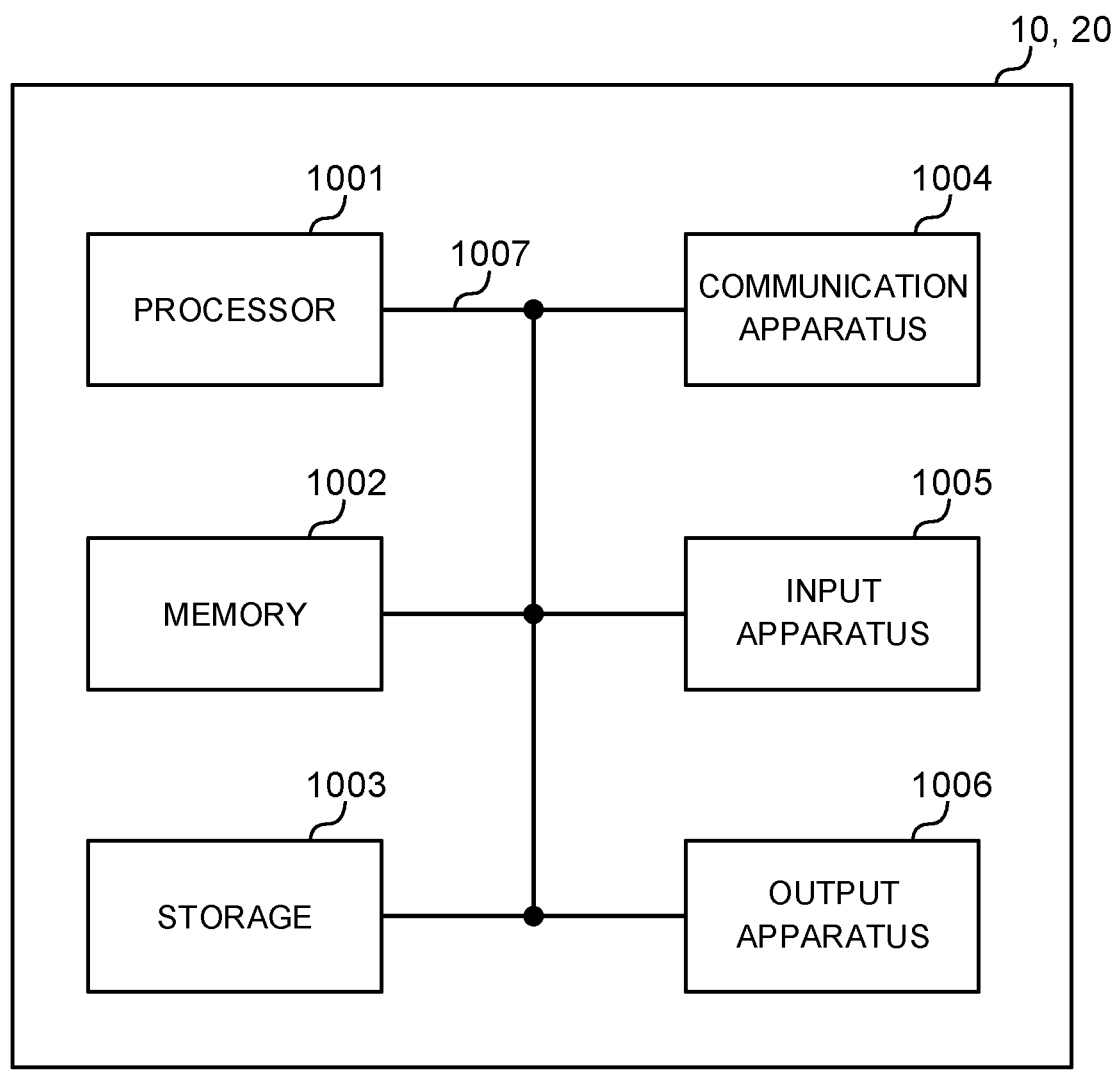
FIG. 8 is a diagram illustrating an example of a hardware structure of a radio base station and a user terminal according to an embodiment of the present invention.

For example, a base station, a user terminal, and the like according to an embodiment of the present disclosure may function as a computer that executes the processing of the radio communication method of the present disclosure. FIG. 8 is a diagram illustrating an example of a hardware structure of a base station and a user terminal according to an embodiment. The above-described base stations 10 and user terminals 20 may be physically structured as a computer apparatus that includes a processor 1001, a memory 1002, a storage 1003, a communication apparatus 1004, an input apparatus 1005, an output apparatus 1006, and a bus 1007.

In the present disclosure, words such as an apparatus, a circuit, a device, a section, and a unit can be replaced with each other. The hardware structure of a base station 10 and a user terminal 20 may be designed to include one or more from each apparatus illustrated in the drawings, or may be designed not to include at least one of the apparatuses.

For example, although only one processor 1001 is illustrated, a plurality of processors may be provided. Processing may be executed by one processor, or may be executed by two or more processors simultaneously, sequentially, or by using another method. The processor 1001 may be implemented with one or more chips.

To implement each function of the base station 10 and the user terminal 20, predetermined software (program) is read into hardware such as the processor 1001 and the memory 1002, so that the processor 1001 may perform calculations to control communication via the communication apparatus 1004 and control at least one of reading or writing of data in the memory 1002 and the storage 1003.

The processor 1001 controls the whole computer by, for example, running an operating system. The processor 1001 may be constituted by a central processing unit (CPU), which includes interfaces with peripheral equipment, a control apparatus, an arithmetic unit, and a register. For example, the above-described baseband signal processing unit 104 (204), call processing unit 105, and the like may be implemented by the processor 1001.

The processor 1001 reads, for example, programs (program codes), software modules, or data from at least one of the storage 1003 or the communication apparatus 1004 into the memory 1002, and executes various types of processing in accordance therewith. As for the programs, programs that cause a computer to execute at least one of the operations described in the above-described embodiments may be used. For example, the control unit 401 of the user terminals 20 may be implemented by a control program that is stored in the memory 1002 and runs on the processor 1001, and other functional blocks may be similarly implemented.

The memory 1002 is a computer-readable recording medium, and may be constituted by, for example, at least one of a read only memory (ROM), an erasable programmable ROM (EPROM), an electrically EPROM (EE-PROM), a random access memory (RAM), or other appropriate storage media. The memory 1002 may be referred to as, for example, a register, a cache, or a main memory (main storage apparatus). The memory 1002 can store a program (program code), a software module, and the like, which are executable for implementing the radio communication method according to an embodiment of the present disclosure.

The storage 1003 is a computer-readable recording medium, and may be constituted by, for example, at least one of a flexible disk, a floppy (registered trademark) disk, a magneto-optical disk (e.g., a compact disc (compact disc ROM (CD-ROM)), a digital versatile disc, a Blu-ray (registered trademark) disk), a removable disk, a hard disk drive, a smart card, a flash memory device (e.g., a card, a stick, or a key drive), a magnetic stripe, a database, a server, or other appropriate storage media. The storage 1003 may be referred to as an auxiliary storage device.

The communication apparatus 1004 is hardware (transmitting/receiving device) for performing inter-computer communication via at least one of a wired network or a radio network, and is also referred to as, for example, a network device, a network controller, a network card, or a communication module. The communication apparatus 1004 may include a high-frequency switch, a duplexer, a filter, and a frequency synthesizer in order to achieve, for example, at least one of frequency division duplex (FDD) or time division duplex (TDD). For example, the above-described transmitting/receiving antennas 101 (201), amplifying units 102 (202), transmitting/receiving units 103 (203), communication path interface 106, and the like may be implemented by the communication apparatus 1004. Each of the transmitting/receiving units 103 (203) may be physically or logically separated into a transmitting unit 103a (203a) and a receiving unit 103b (203b).

The input apparatus 1005 is an input device (e.g., a keyboard, a mouse, a microphone, a switch, a button, or a sensor) that receives input from the outside. The output apparatus 1006 is an output device (e.g., a display, a speaker, or a light emitting diode (LED) lamp) that performs output to the outside. The input apparatus 1005 and the output apparatus 1006 may have an integrated structure (e.g., a touch panel).

The apparatuses such as the processor 1001 and the memory 1002 are connected by the bus 1007 for communicating information. The bus 1007 may be constituted by a single bus, or may be constituted by different buses, one for each connection between apparatuses.

The base station 10 and the user terminal 20 may include hardware such as a microprocessor, a digital signal processor (DSP), an application specific integrated circuit (ASIC), a programmable logic device (PLD), or a field programmable gate array (FPGA), and the hardware may be used to implement some or all of the functional blocks. For example, the processor 1001 may be implemented by using at least one of these pieces of hardware.

(Modifications)

Terms described in the present disclosure and terms necessary for understanding the present disclosure may be replaced with other terms that have the same or similar meanings. For example, channels, symbols, and signals (or signaling) may be replaced with each other. The signals may be messages. A reference signal may be abbreviated as an RS, and may be referred to as, for example, a pilot or a pilot signal depending on a standard to be applied. A component carrier (CC) may be referred to as a cell, a frequency carrier, a carrier frequency, or the like.

A radio frame may be constituted by one or more periods (frames) in a time domain. Each of one or more periods (frames) constituting a radio frame may be referred to as a subframe. The subframe may be constituted by one or more slots in the time domain. The subframe may be a fixed time length (e.g., 1 ms) that does not depend on numerology.

Here, the numerology may be a communication parameter applied to at least one of transmission or reception of a certain signal or channel. For example, the numerology may indicate at least one of, for example, subcarrier spacing (SCS), a bandwidth, a symbol length, a cyclic prefix length, a transmission time interval (TTI), the number of symbols per TTI, a radio frame structure, specific filtering processing performed by a transceiver in a frequency domain, or specific windowing processing performed by a transceiver in a time domain.

The slot may be constituted by one or more symbols, for example, an orthogonal frequency division multiplexing (OFDM) symbol or a single carrier frequency division multiple access (SC-FDMA) symbol in a time domain. The slot may be a time unit based on numerology.

The slot may include a plurality of mini slots. Each mini slot may be constituted by one or more symbols in the time domain. A mini slot may be referred to as a subslot. The mini slot may be constituted by fewer symbols than the slot. A PDSCH (or PUSCH) transmitted in a time unit larger than a mini slot may be referred to as PDSCH (PUSCH) mapping type A. A PDSCH (or PUSCH) transmitted by using a mini slot may be referred to as PDSCH (PUSCH) mapping type B.

A radio frame, a subframe, a slot, a mini slot, and a symbol all represent a time unit at the time when a signal is communicated. Each of the radio frame, the subframe, the slot, the mini slot, and the symbol may be called by other corresponding designations.

For example, one subframe may be referred to as a transmission time interval (TTI). A plurality of consecutive subframes may be referred to as a TTI. One slot or one mini slot may be referred to as a TTI. That is, at least one of a subframe or a TTI may be a subframe (1 ms) in an existing LTE, may be a period shorter than 1 ms (e.g., 1 to 13 symbols), or may be a period longer than 1 ms. A unit representing a TTI may be referred to as, for example, a slot or a mini slot instead of a subframe.

Here, the TTI refers to a minimum time unit of scheduling in radio communication, for example. For example, in an LTE system, scheduling is performed. In the scheduling, a base station allocates radio resources (e.g., frequency bandwidth and transmission power that can be used in each user terminal) to each user terminal in TTI units. The definition of the TTI is not limited to that described above.

The TTI may be a transmission time unit such as a channel-encoded data packet (transport block), a code block, or a codeword, or may be a processing unit such as scheduling or link adaptation. When a TTI is given, a time section (e.g., the number of symbols) in which, for example, a transport block, a code block, or a codeword is actually mapped may be shorter than the TTI.

When one slot or one mini slot is referred to as a TTI, one or more TTIs (i.e., one or more slots or one or more mini slots) may be a minimum time unit of scheduling. The number of slots (the number of mini slots) constituting the minimum time unit of the scheduling may be controlled.

A TTI having a time length of 1 ms may be referred to as a usual TTI (TTI in LTE Rel. 8 to 12), a normal TTI, a long TTI, a usual subframe, a normal subframe, a long subframe, a slot, or the like. A TTI shorter than the usual TTI may be referred to as a shortened TTI, a short TTI, a partial TTI (or fractional TTI), a shortened subframe, a short subframe, a mini slot, a subslot, a slot, or the like.

A long TTI (e.g., usual TTI or subframe) may be replaced with a TTI having a time length exceeding 1 ms. A short TTI (e.g., shortened TTI) may be replaced with a TTI having a TTI length less than the TTI length of the long TTI and equal to or more than 1 ms.

A resource block (RB) is a resource allocation unit in a time domain and a frequency domain, and may include one or more consecutive subcarriers in the frequency domain.

The resource block (RB) may include one or more symbols in the time domain, and may be one slot, one mini slot, one subframe, or the length of one TTI. Each of one TTI and one subframe may be constituted by one or more resource blocks.

One or more resource blocks (RBs) may be referred to as a physical resource block (physical RB (PRB)), a subcarrier group (SCG), a resource element group (REG), a PRB pair, an RB pair, or the like.

The resource block may be constituted by one or more resource elements (REs). For example, one RE may be a radio resource domain of one subcarrier and one symbol.

The structures of the radio frame, subframe, slot, mini slot, symbol and the like described above are merely examples. For example, various changes can be made to structures pertaining to the number of subframes included in a radio frame, the number of slots per subframe or radio frame, the number of mini slots included in a slot, the number of symbols and resource blocks (RBs) included in a slot or a mini slot, the number of subcarriers included in a resource block (RB), the number of symbols in a TTI, a symbol length, a cyclic prefix (CP) length, and the like.

The information, parameters, and the like described in the present disclosure may be represented by absolute values, relative values with respect to predetermined values, or may be represented using other pieces of applicable information. For example, a radio resource may be specified by a predetermined index.

The names used for parameters and the like in the present disclosure are in no respect limiting. In addition, an equation and the like using these parameters may differ from those explicitly disclosed in the present disclosure. Various channels such as a physical uplink control channel (PUCCH) and a physical downlink control channel (PDCCH) and information elements can be identified by any suitable names, and thus various names allocated to these various channels and information elements are in no respect limiting.

The information, signals, and the like described in the present disclosure may be represented by using any of various different technologies. For example, data, instructions, commands, information, signals, bits, symbols, and chips, which may be referred to throughout the above description, may be represented by voltages, currents, electromagnetic waves, magnetic fields or particles, optical fields or photons, or any combination thereof.

The information, signals, and the like can be output in at least one of a direction from higher layers to lower layers or a direction from lower layers to higher layers. The information, signals, and the like may be input and output via a plurality of network nodes.

Information, signals, and the like that have been input or output may be stored in a specific location (e.g., memory), or may be managed by using a control table. Information, signals, and the like to be input or output can be overwritten, updated or appended. Information, signals, and the like that have been output may be deleted. Information, signals, and the like that have been input may be transmitted to other apparatuses.

Notification of information is by no means limited to the aspects/embodiments described in the present disclosure, and may be performed by using other methods. For example, notification of information may be implemented by using physical layer signaling (e.g., downlink control information (DCI), uplink control information (UCI)), higher layer signaling (e.g., radio resource control (RRC) signaling, broadcast information (master information block (MIB), system information block (SIB), or the like), or medium access control (MAC) signaling), other signals, or any combination thereof.

The physical layer signaling may be referred to as Layer 1/Layer 2 (L1/L2) control information (L1/L2 control signal), L1 control information (L1 control signal), or the like. The RRC signaling may be referred to as an RRC message, and may be, for example, an RRC connection setup message or an RRC connection reconfiguration message. The MAC signaling may be reported by using, for example, a MAC control element (MAC CE).

A notification of predetermined information (e.g., a notification of information on the fact that "X holds") does not necessarily have to be given explicitly, but may be given implicitly (e.g., by not giving a notification of the predetermined information, or by giving a notification of another piece of information).

A judgment may be made in values represented by one bit (0 or 1), may be made in Boolean values that represent true or false, or may be made by comparing numerical values (e.g., comparison with a predetermined value).

Software should be widely interpreted to mean, for example, instructions, instruction sets, codes, code segments, program codes, programs, subprograms, software modules, applications, software applications, software packages, routines, subroutines, objects, executable files, execution threads, procedures, and functions, regardless of whether being referred to as software, firmware, middleware, a microcode, and a hardware description language or by another name.

Software, commands, information, and the like may be transmitted and received via communication media. For example, in a case where software is transmitted from a website, a server, or other remote sources by using at least one of a wired technology (coaxial cable, optical fiber cable, twisted pair, digital subscriber line (DSL), or the like) or a radio technology (infrared light, microwave, or the like), at least one of the wired technology or the radio technology is also included in the definition of communication medium.

The terms "system" and "network" as used in the present disclosure are used interchangeably.

In the present disclosure, the terms such as "precoding", "precoder", "weight (precoding weight)", "quasi-Co-Location (QCL)", "transmission configuration indication (TCI) state", "spatial relation", "spatial domain filter", "transmission power", "phase rotation", "antenna port", "antenna port group", "layer", "the number of layers", "rank", "resource", "resource set", "resource group", "beam", "beam width", "beam angle", "antenna", "antenna element", and "panel" are used interchangeably.

In the present disclosure, the terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)" are used interchangeably. The base station may be called by a term such as a macro cell, a small cell, a femto cell, or a pico cell.

The base station can house one or more (e.g., three) cells (also referred to as "sectors"). In a case where the base station houses a plurality of cells, the entire coverage area of the base station can be partitioned into a plurality of smaller areas. Each smaller area can provide communication service by using a base station subsystem (e.g., indoor small base station (remote radio head (RRH))). The term "cell" or "sector" refers to a part or all of a coverage area of at least one of a base station or a base station subsystem, which perform communication service in the coverage.

In the present disclosure, the terms such as a "mobile station (MS)", a "user terminal", "user equipment (UE)", and a "terminal" are used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, and a client, or by some other appropriate terms.

At least one of the base station or the mobile station may be referred to as, for example, a transmitting apparatus, a receiving apparatus, or a communication apparatus. At least one of the base station or the mobile station may be, for example, a device mounted on a moving object or the moving object itself. The moving object may be a vehicle (e.g., car or airplane), an unmanned moving object (e.g., drone or autonomous vehicle), or a robot (of manned or unmanned type). At least one of the base station or the mobile station includes an apparatus that does not necessarily move during a communication operation. For example, at least one of the base station or the mobile station may be an Internet of Things (IoT) device such as a sensor.

The base stations in the present disclosure may be replaced with user terminals. For example, each aspect/embodiment of the present disclosure may be applied to a structure in which communication between a base station and a user terminal is replaced with communication among a plurality of user terminals (which may be referred to as, for example, device-to-device (D2D) or vehicle-to-everything (V2X)). In this case, the user terminals 20 may have the functions of the base stations 10 described above. Words such as "uplink" and "downlink" may be replaced with words corresponding to inter-terminal communication (e.g., "side"). For example, an uplink channel, a downlink channel, or the like may be replaced with a side channel.

Similarly, a user terminal in the present disclosure may be replaced with a base station. In this case, the base station 10 may have the functions of the user terminal 20 described above.

In the present disclosure, an operation performed by a base station may be performed by an upper node thereof in some cases. In a network including one or more network nodes having a base station, it is obvious that various operations performed for communication with a terminal can be performed by a base station, one or more network nodes (examples may include, but not limited to, mobility management entities (MMEs) and serving-gateways (S-GWs)) other than base stations, or any combination thereof.

The aspects/embodiments described in the present disclosure may be used individually or in combination, or may be switched in association with execution. The order of steps in each processing procedure, sequence, flowchart, or the like of the aspects/embodiments described in the present disclosure may be changed as long as no inconsistency arises. For example, although various step elements have been presented by using an illustrative order for the method described in the present disclosure, the method is not limited to the presented specific order.

Each aspect/embodiment described in the present disclosure may be applied to, for example, a system using long term evolution (LTE), LTE-Advanced (LTE-A), LTE-Beyond (LTE-B), SUPER 3G, IMT-Advanced, 4th generation mobile communication system (4G), 5th generation mobile communication system (5G), future radio access (FRA), new radio access technology (New-RAT), New Radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate radio communication methods, and a next generation system expanded on the basis of these. A plurality of systems may be combined and applied (e.g., a combination of LTE or LTE-A and 5G).

The phrase "on the basis of" as used in the present disclosure does not mean "on the basis of only", unless otherwise specified. In other words, the phrase "on the basis of" means both "on the basis of only" and "on the basis of at least".

Any reference to elements using a designation such as "first" or "second" used in the present disclosure does not generally limit the quantity or order of these elements. These designations can be used in the present disclosure as a convenient method for distinguishing between two or more elements. Reference to the first and second elements does not mean that only two elements may be adopted, or that the first element is required to precede the second element in some way.

The term "determining" as used in the present disclosure may encompass a wide variety of operations. For example, "determining" may be considered to mean judging, calculating, computing, processing, deriving, investigating, looking up, search, inquiry (e.g., looking up in a table, a database, or another data structure), ascertaining, or the like.

"Determining" may be considered to mean making a "determination" related to receiving (e.g., receiving information), transmitting (e.g., transmitting information), inputting, outputting, accessing (e.g., accessing data in a memory), or the like.

"Determining" may be considered to mean making a "determination" related to resolving, selecting, choosing, establishing, comparing, or the like. In other words, "determining" may be considered to mean making a "determination" related to some operation.

"Determining" may be replaced with "assuming", "expecting", "considering" or the like.

The "maximum transmission power" described in the present disclosure may mean a maximum value of transmission power, nominal UE maximum transmit power, or rated UE maximum transmit power.

Terms "connected" and "coupled", and any other variation thereof used in the present disclosure mean any direct or indirect connection or coupling between two or more elements. One or more intermediate elements can be placed between two elements that are "connected" or "coupled" with each other. The coupling or connection between elements may be physical, logical or a combination thereof. For example, "connection" may be replaced with "access".

In a case where two elements are connected in the present disclosure, the two elements can be considered to be "connected" or "coupled" with each other by using, for example, one or more electrical wires, cables, or print electrical connections, and by using electromagnetic energy having a wavelength of a radio frequency domain, a microwave domain, or a light (both visible and invisible light) domain in some non-limiting and non-inclusive examples.

In the present disclosure, the phrase "A and B are different" may mean "A and B are different from each other". The terms such as "separated" or "coupled" may be interpreted in a similar manner.

In a case where the terms such as "include", "including", and variations thereof are used in the present disclosure, these terms are intended to be inclusive, in a manner similar to the way the term "comprising" is used. Furthermore, the term "or" as used in the present disclosure is intended to be not an exclusive-OR.

In a case where the present disclosure includes an article, such as "a", "an", or "the" in English, that has been added during the process of translation, the noun that follow such an article may include a meaning of a plural form in the present disclosure.

Although the invention according to the present disclosure has been described in detail above, it is obvious to a person skilled in the art that the invention according to the present disclosure is not limited to the embodiments described in the present disclosure. The invention according to the present disclosure can be implemented with corrections and in modifications, without departing from the spirit and scope of the invention defined by the recitations of claims. The description in the present disclosure is provided for the purpose of exemplification and explanation, and should by no means be construed to limit the invention according to the present disclosure in any way.

The invention claimed is:

1. A terminal comprising:
a receiver that receives a synchronization signal block (SSB);
a processor that, in a beam recovery procedure based on a random access procedure, measures the SSB and selects a physical random access channel (PRACH) corresponding to the SSB that is selected according to a result of the measurement; and
a transmitter that transmits a beam recovery request using the PRACH,
wherein, when a transmission configuration indicator (TCI) state is not configured in a control resource set (CORESET) and a contention-based random access procedure is performed, the processor assumes quasi-colocation (QCL) information, corresponding to the SSB that corresponds to the PRACH, as the QCL information corresponding to the CORESET, and
wherein an index of the CORESET is 0.

2. A radio communication method for a terminal, the method comprising:
receiving a synchronization signal block (SSB);
measuring the SSB and selecting a physical random access channel (PRACH) corresponding to the SSB that is selected according to a result of the measurement, in a beam recovery procedure based on a random access procedure;
transmitting a beam recovery request using the PRACH; and
assuming, when a transmission configuration indicator (TCI) state is not configured in a control resource set (CORESET) and a contention-based random access procedure is performed, quasi-colocation (QCL) information, corresponding to the SSB that corresponds to the PRACH, as the QCL information corresponding to the CORESET, wherein an index of the CORESET is 0.

3. A system comprising a terminal and a base station, wherein:

the base station comprises:
- a first transmitter that transmits a synchronization signal block (SSB) to the terminal, and the terminal comprises:
- a receiver that receives the SSB;
- a processor that, in a beam recovery procedure based on a random access procedure, measures the SSB and selects a physical random access channel (PRACH) corresponding to the SSB that is selected according to a result of the measurement; and
- a second transmitter that transmits a beam recovery request using the PRACH, wherein, when a transmission configuration indicator (TCI) state is not configured in a control resource set (CORESET) and a contention-based random access procedure is performed, the processor assumes quasi-colocation (QCL) information, corresponding to the SSB that corresponds to the PRACH, as the QCL information corresponding to the CORESET and wherein an index of the CORESET is 0.

* * * * *